United States Patent Office 3,346,565
Patented Oct. 10, 1967

3,346,565
1,2,3,5 - TETRAHYDRO - 4,1 - BENZOXAZEPINES AND 3,5 - DEHYDRO - 4,1 - BENZOXAZEPIN-2-(1H)-ONES
Emilio Testa, Vacallo, Tessin, Switzerland, and Luigi Fontanella, Milan, Italy, assignors to Lepetit S.p.A., Milan, Italy
No Drawing. Filed May 21, 1964, Ser. No. 369,290
Claims priority, application Great Britain, May 22, 1963, 20,442/63
15 Claims. (Cl. 260—239.3)

This invention is concerned with new compounds having sedative, tranquillizing and hypnotic activity. The compounds with which the invention is concerned are 3,5-dihydro-4,1-benzoxazepine derivatives of the formula

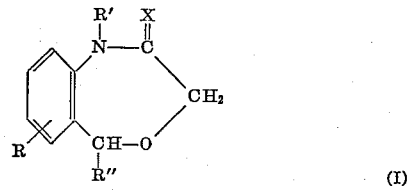

wherein R is H or halogen; R' represents alkyl, aralkyl, acyl and the group

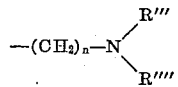

in which n is an integer from 1 to 5 and R''' and R'''' are the same or different and represent H, alkyl, or together form an heterocyclic optionally substituted ring; R'' represents H, alkyl, aryl, aralkyl and X represents O or $H_2$.

The process for preparing the new compounds depends on the nature of the group R', and consists in introducing by conventional methods said substituent on the compound

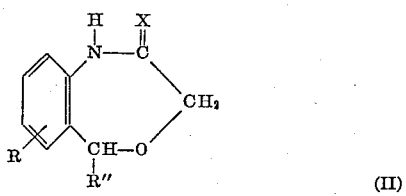

wherein R, R'' and X have the above significances, prepared as described in our copending application Serial No. 369,317 filed May 21, 1964. Thus when R' is alkyl, aralkyl or

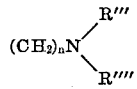

wherein R''' and R'''' have the above significances, the compounds are prepared by reacting II with the appropriate halide in an alkaline medium; when R' is acyl the compounds are prepared by reacting II with a functional derivative of the selected acid.

The following non-limitative examples illustrates the invention.

EXAMPLE 1

1-methyl-5-phenyl - 3,5 - dihydro - 4,1 - benzoxazepin-2-(1H)-one(I)

To 50 ml. of liquid $NH_3$ in a 250 ml. flask 250 mg. of sodium are added followed by a crystal of ferric nitrate. The mixture is stirred for 60 minutes keeping the temperature at —40° C., then 2.39 g. of 5-phenyl-3,5-dihydro-4,1-benzoxazepin-2(1H)-one (prepared as described in our above-mentioned copending application Ser. No. 369,317) are added in small portions. Stirring is continued at —40° C. for 15 minutes, and 1.76 g. of $CH_3I$ dissolved in anhydrous ethyl ether are added. After one hour of additional stirring at —40° C., $NH_3$ is allowed to evaporate and 200 ml. of ethyl ether are added. The mixture is refluxed for 1.5 hours, then filtered. Petroleum ether is added and the obtained 1.5 g. of crude product are recrystallized from ethyl ether. Yield 1.2 g. of I, M.P. 110–111° C.

EXAMPLE 2

1-acetyl-5-phenyl - 1,2,3,5 - tetrahydro-4,1-benzoxazepine (II)

A suspension of 6 g. of 5-phenyl-1,2,3,5-tetrahydro-4,1-benzoxazepine (prepared as described in our above-mentioned copending application Ser. No. 369,317) in 20 ml. of acetic anhydride is slowly heated at 120° C. until complete solution occurs. The mixture is heated for 1 hour at 120° C., then cooled to 60° C. and poured into 5 volumes of water at 60° C. The separated oily product becomes quickly solid on cooling. It is washed with water and recrystallized from absolute ethanol. Yield 6.75 g. of II, M.P. 149–150° C.

EXAMPLE 3

1-propionyl-5-phenyl - 1,2,3,5 - tetrahydro-4,1-benzoxazepine (III)

Prepared according to the process of the preceding example from 3 g. of 5-phenyl-1,2,3,5-tetrahydro-4,1-benzoxazepine and propionic anhydride. Yield 3.3 g., M.P. 148–150° C.

EXAMPLE 4

1-phenylcarbamyl-5-phenyl - 1,2,3,5 - tetrahydro-4,1-benzoaxepine (IV)

(a) A solution of 500 mg. of 5-phenyl-1,2,3,5-tetrahydro-4,1-benzoxazepine in 10 ml. of ethyl ether are treated with 0.5 ml. of phenylisocyanate and refluxed for 15 minutes. On cooling a crystalline product separates out and is recrystallized from ethyl ether. Yield 0.650 mg., M.P. 188–189° C.

(b) To a solution of 5.3 g. of phosgene in 80 ml. of anhydrous toluene, cooled to —5° C., a solution of 2 g. of 5-phenyl-1,2,3,5-tetrahydro-4,1-benzoxazepine in 20 ml. of toluene is added. The mixture is stirred four hours at room temperature, 1 hour at 50° C., and then concentrated to dryness in vacuo to give an oil which becomes solid on cooling; yield 2.6 g., M.P. 134–136° C. One gram of this compound dissolved in 10 ml. of anhydrous toluene is treated with 2 ml. of aniline and refluxed for 30 minutes. The solution is cooled, the excess aniline is extracted with aqueous HCl, the toluene solution is dried over $Na_2SO_4$ and concentrated to dryness in vacuo. The residue is recrystallized from ethyl ether giving IV, M.P. 188–189° C.

EXAMPLE 5

*1-nitroso-5-phenyl - 1,2,3,5 - tetrahydro-4,1-benzoxazepine (V)*

To a solution of 10 g. of 5-phenyl-1,2,3,5-tetrahydro-4,1-benzoxazepine in 150 ml. of 80% acetic acid 4 g. of $NaNO_2$ are added portionwise under stirring, keeping the temperature at 5° C. The solution is heated to 90° C. and stirring is continued at this temperature for 60 minutes. Then it is cooled, extracted with benzene, washed with water and with $NaHCO_3$, then again with water, evaporated to dryness and the oily residue is crystallized from petroleum ether. Yield 9.1 g. of V, M.P. 88–89° C.

EXAMPLE 6

*1-diethylaminoethyl-5-phenyl - 7 - chloro-3,5-dihydro-4,1-benzoxazepin-2(1H)-one (VI)*

A mixture of 27 g. of 5-phenyl-7-chloro-3,5-dihydro-4,1-benzoxazepin-2(1H)-one, and 3.9 g. of $NaNH_2$ in 350 ml. of anhydrous dioxane, is refluxed for one hour, then it is cooled to 40° C. and 13.6 g. of 1-chloro-2-diethylaminoethane are added. The mixture is refluxed 15 hours, then it is cooled, filtered and the solution evaporated to dryness. The residue is taken up with water, dissolved with 10% HCl, washed with diethyl ether, made alkaline and extracted with diethyl ether. The organic layer is washed with water, treated with charcoal and dried over $Na_2SO_4$. The solvent is evaporated and the residue crystallized from petroleum ether; yield 2.6 g. of VI, M.P. 55–80° C.

EXAMPLE 7

*1-piperidinoethyl-5-phenyl - 7 - chloro - 3,5 - dihydro-4,1-benzoxazepin-2(1H)-one (VII)*

Prepared according to the process of the preceding example from 5.5 g. of 5-phenyl-7-chloro-3,5-dihydro-4,1-benzoxazepin-2(1H)-one and 3.3 g. of N-(beta-chloroethyl)-piperidine. Yield 4.3 g., M.P. 247° C.

EXAMPLE 8

*1-(γ-dimethylaminopropyl) - 5 - phenyl-7-chloro-3,5-dihydro-4,1-benzoxazepin-2(1H)-one (VIII)*

Prepared according to the procedure described in Example 6 starting from 4.3 g. of 5-phenyl-7-chloro-3,5-dihydro-benzoxazepin-2(1H)-one and 2.2 g. of 3-dimethylamino-1-chloropropane; yield 3.75 g., M.P. 88–91° C.

EXAMPLE 9

*1-{1-[3-(4'-methyl-1'-piperazinyl)]-propyl}-5-phenyl-7-chloro-3,5-dihydro-4,1-benzoxazepin-2(1H)-one (IX)*

Prepared as described in Example 6 starting from 2.7 g. of 5 - phenyl - 7 - chloro-3,5-dihydro-4,1-benzoxazepin-2(1H)-one and 1.7 g. of 1-methyl-4-(p-chloropropyl)-piperazine; yield 1.7 g., M.P. 108–110° C.

EXAMPLES 10–15

The following compounds are prepared following substantially the procedure described in the preceding examples:

We claim:
1. A compound of the class consisting of 3,5-dihydro-4,1-benzoxazepines of the formula:

| R | R' | R'' | X | M.P., °C. | B.P., °C. |
|---|---|---|---|---|---|
| H | $COCH_3$ | H | $H_2$ | | 100–105/0.6 |
| H | CO—⟨⟩—Cl | H | $H_2$ | 127–129 | |
| H | COCl | $C_6H_5$ | $H_2$ | 144–146 | |
| H | CO—⟨⟩—Cl | H | O | 110–112 | |
| H | $(CH_2)_3$—N⟨⟩—$CH_3$ | H | O | | 190–195/0.6 |
| H | $CH_2CH_2$—$N(C_2H_5)_2$ | H | O | | 160–170/1.5 |

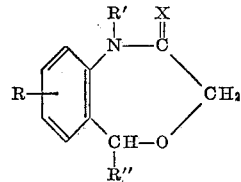

$$-(CH_2)_n-B$$

wherein R is a member of the class consisting of hydrogen and halogen, R' is a member of the class consisting of acetyl, propionyl, phenylcarbamyl, chlorobenzoyl, chlorocarbonyl and nitroso groups and a group of the formula $$-(CH_2)_n-B$$

wherein n is an integer from 1 to 5, and B is a member of the class consisting of dimethylamino, diethylamino, 1-piperidino, and 4-methyl-1-piperazino groups, X is a member of the class consisting of O and $H_2$, and R'' is a member of the class consisting of hydrogen and the phenyl group.

2. 1 - acetyl - 5 - phenyl - 1,2,3,5 - tetrahydro - 4,1-benzoxazepine.

3. 1 - propionyl - 5 - phenyl - 1,2,3,5 - tetrahydro - 4,1-benzoxazepine.

4. 1 - phenylcarbamyl - 5 - phenyl - 1,2,3,5 - tetrahydro-4,1-benzoxazepine.

5. 1-acetyl-1,2,3,5-tetrahydro-4,1-benzoxazepine.

6. 1 - p - chlorobenzoyl - 1,2,3,5 - tetrahydro - 4,1-benzoxazepine.

7. 1 - nitroso - 5 - phenyl - 1,2,3,5 - tetrahydro - 4,1-benzoxazepine.

8. 1 - p - chlorobenzoyl - 3,5 - dihydro - 4,1 - benzoxazepin-2(1H)-one.

9. 1 - chloroformyl - 5 - phenyl - 1,2,3,5 - tetrahydro-4,1-benzoxazepine.

10. 1 - dimethylaminopropyl - 5 - phenyl - 7 - chloro-3,5-dihydro-4,1-benzoxazepin-2(1H)-one.

11. 1 - piperidinoethyl - 5 - phenyl - 7 - chloro - 3,5-dihydro-4,1-benzoxazepin-2(1H)-one.

12. 1 - diethylaminoethyl - 5 - phenyl - 7 - chloro - 3,5-dihydro-4,1-benzoxazepin-2(1H)-one.

13. 1 - { - 1 - [3 - (4' - methyl - 1' - piperazinyl)]-propyl} - 5 - phenyl - 7 - chloro - 3,5 - dihydro - 4,1-benzoxazepin-2(1H)-one.

14. 1 - { - 1 - [3 - (4' - methyl - 1' - piperazinyl)]-propyl}-3,5-dihydro-4,1-benzoxazepin-2(1H)-one.

15. 1 - diethylaminoethyl - 3,5 - dihydro - 4,1 - benzoxazepin-2(1H)-one.

References Cited
UNITED STATES PATENTS

| | | | |
|---|---|---|---|
| 3,122,554 | 2/1964 | Poos | 260—239.3 |
| 3,155,649 | 11/1964 | Krapcho et al. | 260—239.3 |

OTHER REFERENCES

Testa et al. (I): Chemical Abstracts, vol. 60, pages 6847–6849, March 1964.

Testa et al. (II): Farmaco (Pavia), Edizione Scientifica, vol. 18, No. 11, pages 815–827, 1963.

HENRY R. JILES, *Primary Examiner.*

ALEX MAZEL, *Examiner.*

J. W. ADAMS, *Assistant Examiner.*